United States Patent
Blackburn et al.

[11] Patent Number: 5,861,727
[45] Date of Patent: *Jan. 19, 1999

[54] SYSTEM FOR CONTROLLING OPERATION OF A SWITCHED RELUCTANCE MOTOR BETWEEN MULTI-PHASE OPERATING MODE AND A REDUCED PHASE OPERATING MODE

[75] Inventors: Scott E. Blackburn, Temperance, Mich.; Sergei F. Kolomeitsev, Sylvania, Ohio

[73] Assignee: Dana Corporation, Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 633,600

[22] Filed: Apr. 17, 1996

[51] Int. Cl.$^6$ .................................................. H02P 7/00
[52] U.S. Cl. .......................................... 318/701; 318/254
[58] Field of Search .................................. 318/701, 254, 318/436, 138, 696, 685

[56] References Cited

U.S. PATENT DOCUMENTS

| | | | |
|---|---|---|---|
| 3,440,508 | 4/1969 | Fujita . | |
| 3,787,727 | 1/1974 | McSparran | 318/696 |
| 4,093,905 | 6/1978 | von Braun | 318/696 |
| 4,282,472 | 8/1981 | Martin | 318/696 |
| 4,626,763 | 12/1986 | Edward . | |
| 4,673,849 | 6/1987 | Sears et al. . | |
| 4,701,687 | 10/1987 | Yoshimoto | 318/696 |
| 4,763,060 | 8/1988 | Takahashi | 318/811 |
| 4,847,743 | 7/1989 | Kamiyama | 363/41 |
| 4,896,088 | 1/1990 | Jahns | 318/696 |
| 4,941,553 | 7/1990 | Harrison | 318/614 X |
| 5,001,375 | 3/1991 | Jones | 318/138 X |
| 5,084,662 | 1/1992 | Palaniappan et al. . | |
| 5,162,709 | 11/1992 | Ohi | 318/254 |
| 5,166,591 | 11/1992 | Stephens et al. . | |
| 5,260,635 | 11/1993 | Bahn . | |
| 5,274,287 | 12/1993 | Bahn . | |
| 5,296,787 | 3/1994 | Albrecht et al. | 318/254 X |
| 5,327,069 | 7/1994 | Radun et al. . | |
| 5,457,374 | 10/1995 | Branecky et al. | 318/801 |
| 5,459,385 | 10/1995 | Lipo et al. | 318/701 |
| 5,489,831 | 2/1996 | Harris | 318/701 |
| 5,545,963 | 8/1996 | Aizawa | 318/696 |

Primary Examiner—Jonathan Wysocki
Attorney, Agent, or Firm—Dykema Gossett PLLC

[57] ABSTRACT

An apparatus for controlling a switched reluctance machine changes the operating modes between a single-phase operating mode, and a multi-phase operating mode. The switched reluctance motor includes a rotatable rotor, a stator, and a plurality of stator windings defining a corresponding plurality of machine phases. When in the multi-phase mode, all of the plurality of stator windings corresponding to the plurality of machine phases are energized. When in the single-phase mode, stator windings corresponding to a single, selected machine phase are energized. The apparatus includes a logic circuit for sensing a speed of the rotor and generating a speed signal in response thereto, and a comparator circuit. The comparator circuit is responsive to the generated speed signal and is operative for changing the operating mode of the motor from the multi-phase mode to the single-phase mode when the rotor speed reaches a first predetermined level, and for changing the operating mode of the machine from the single-phase mode to the multi-phase mode when the rotor speed reaches a second predetermined level that is less than the first predetermined level. The first and second levels are offset and define a hysteresis operating band to prevent undesirable oscillation or "hunting" between the single-phase mode, and the multi-phase mode. In the single-phase mode, the current reference used for the energized stator windings associated with the selected machine phase is higher, than the corresponding current reference in the multi-phase mode.

11 Claims, 3 Drawing Sheets

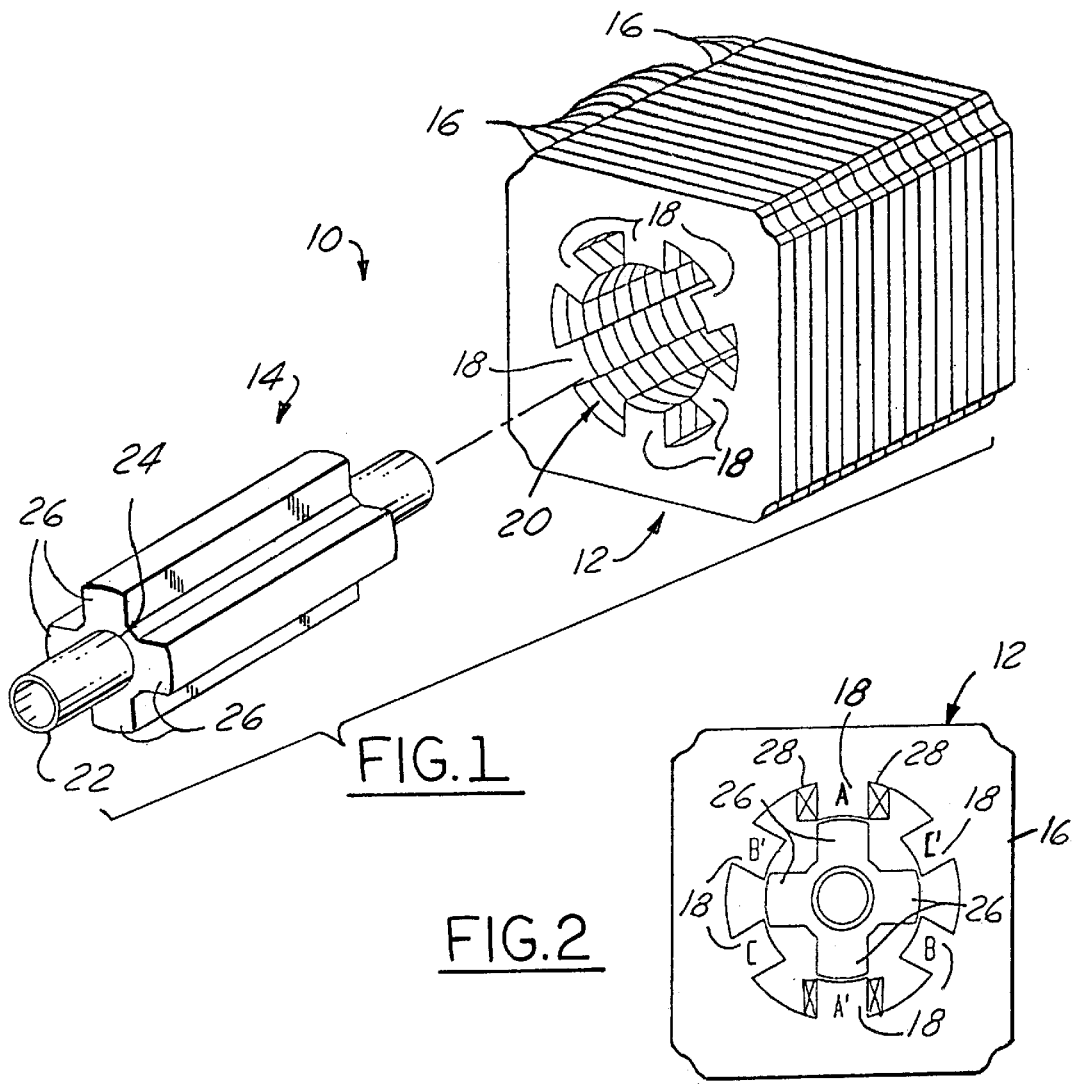
FIG. 1
FIG. 2
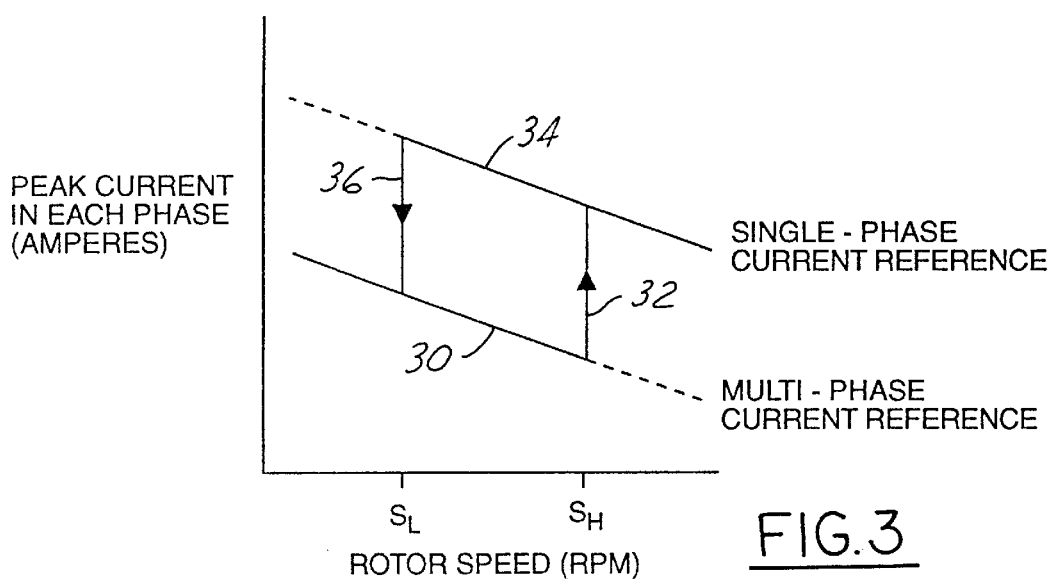
FIG. 3

SYSTEM FOR CONTROLLING OPERATION OF A SWITCHED RELUCTANCE MOTOR BETWEEN MULTI-PHASE OPERATING MODE AND A REDUCED PHASE OPERATING MODE

BACKGROUND OF THE INVENTION

1. Technical Field

This invention relates generally to a system for controlling a switch-reluctance (SR) motor, and more particularly, to a system for particularly controlling the operation of an SR motor between a multi-phase mode and a reduced phase operating mode.

2. Discussion of the Related Art

Switched reluctance (SR) machines have been the subject of increased investigation due to their many advantages, which makes them suitable for use in a wide variety of situations. An SR machine operates on the basis of varying reluctance in its several magnetic circuits. In particular, such machines are generally doubly salient motors—that is, they have teeth or poles on both the stator and the rotor. The stator teeth have windings which form machine phases of the motor. In a common configuration, stator windings on diametrically opposite poles are connected in series to form one machine phase.

When a stator phase is energized, the closest rotor pole pair is attracted towards the stator pole pair having the energized stator winding, thus minimizing the reluctance of the magnetic path. By energizing consecutive stator windings (i.e., machine phases) in succession, in a cyclical fashion, it is possible to develop torque, and thus rotation of the rotor in either a clockwise, or counter-clockwise direction.

As further background, the inductance of a stator winding associated with a stator pole pair varies as a function of rotor position. Specifically, the inductance varies from a lower level, when a rotor pole is unaligned with a corresponding stator pole, to an upper or maximum level when the rotor pole and stator pole are in alignment. Thus, when the rotor pole rotates and sweeps past a stator pole, the inductance of the stator winding varies through lower-upper-lower inductance levels. This inductance-versus-rotor position characteristic is particularly relevant for controlled operation of the motor. Specifically, current flowing through the stator winding must be switched on prior to (i.e., advanced), and maintained during the rising inductance period to develop positive torque. Since positive phase current during the decreasing inductance interval produces a negative or breaking torque, the phase current must be switched off before this interval occurs to avoid generating negative torque. Accordingly, rotor position sensing is an integral part of a closed-loop variable-reluctance motor drive system so as to appropriately control torque generation.

Further, such motors may be operated in a multi-phase mode of operation, which is desirable when a relatively large load is driven by the motor. However, in some instances, the motor may be operated for a period of time in a low load condition (e.g., no load, or lightly loaded—hereinafter a "Low Load Condition"). When this occurs, the speed of the motor may rise rapidly. Conventional control methods and devices have continued to operate the motor in a multi-phase mode in this low load condition (i.e., all of the machine phases being sequentially energized to effect rotor rotation). This mode of operation, however, is less than optimally efficient. Particularly, since only a low load is being driven, energizing current in each of the multiple phases goes to a low level, which, for SR motors, may generate less torque per unit current than when energized at a higher current level.

Accordingly, there is a need to provide an improved system for controlling a switched reluctance machine that minimizes or eliminates one or more of the problems as set forth above.

SUMMARY OF THE INVENTION

The present invention provides an improved system for controlling operation of a switched reluctance machine. In particular, the present invention provides an apparatus for changing the operating mode of the switched reluctance machine between a multi-phase operating mode, wherein a first number of the machine phases are energized, and a reduced phase operating mode, wherein a second number less than said first number of machine phases are energized, according to a hysteresis loop operating map wherein two rotor speed references are used. One advantage of the present invention is that mode changes are made in a controlled fashion, thus eliminating the "hunting" or "oscillation" between modes that may otherwise occur if only a single rotor speed reference was used. Another advantage of the present invention is that the electrical energy consumed by the motor is minimized during operation in the reduced phase mode (relative to the multi-phase mode).

The apparatus for controlling the switched reluctance machine includes means for sensing the speed of the rotor portion of the motor and generating a speed signal in response thereto, and an operating mode changing means. The speed signal is used, in a preferred embodiment, as a proxy for the load on the motor output shaft. The operating mode changing means is responsive to the speed signal for changing the operating mode of the machine from the multi-phase mode to the reduced phase mode when the rotor speed reaches a first predetermined level, and for changing the operating mode of the machine from the reduced phase mode to the multi-phase mode when the rotor speed reaches a second, predetermined level that is less than the first predetermined level. The relative magnitudes of the first and second predetermined levels are based on an assumption that when the speed of the motor rotor rises to reach the first predetermined level, the motor is operating under the above-mentioned low load condition. When this occurs, it is desirable to change the operational state of the motor from the multi-phase mode to the reduced phase mode. Furthermore, as a result, the operating condition of the motor follows a hysteresis-like track, defined by the first and second predetermined rotor speed levels, which prevents the hunting or oscillating between modes that might otherwise occur if only a single transition speed was provided and the motor was operated at or near that transition speed.

In a preferred embodiment, the multi-phase mode has a multi-phase current reference associated therewith, and the reduced phase mode has a reduced phase current reference associated therewith. The reduced phase current reference is larger in magnitude; thus, although fewer phases are energized, they are energized to a higher, more efficient current level (i.e., more torque production per unit current than at the current levels associated with no or low load area). Only selected ones of the machine phases need be provided with the reduced phase current reference because the nonselected ones of the machine phases would be completely disabled during the reduced phase mode. In one preferred embodiment, a three-phase SR motor is controlled to operate in a single-phase mode.

These and other features and objects of this invention will become apparent to one skilled in the art from the following detailed description and the accompanying drawings illustrating features of this invention by way of example, but not by way of limitation.

BRIEF DESCRIPTION OF THE DRAWINGS

FIG. 1 is an exploded, perspective view of a portion of a switched reluctance electric motor suitable for use in connection with a preferred embodiment of the present invention.

FIG. 2 is a diagrammatic, exaggerated, cross-sectional view of a switched reluctance electric motor illustrating the relative positions of a stator, and rotor portions thereof.

FIG. 3 is a simplified, rotor speed-versus-phase current diagram view illustrating a reduced phase (single phase) mode, and multi-phase mode current reference traces as a function of rotor speed.

DETAILED DESCRIPTION OF THE PREFERRED EMBODIMENTS

Figure 4:
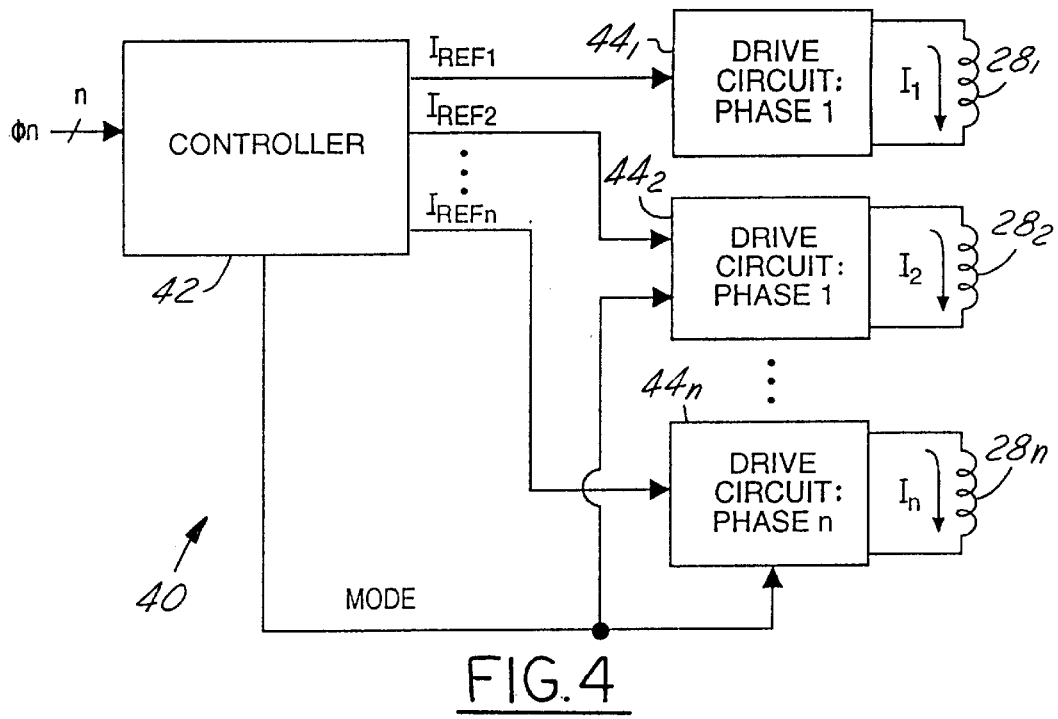
FIG. 4 is a simplified, block and schematic diagram view showing a preferred control apparatus embodiment in accordance with the present invention illustrating, particularly, a selected machine phase to be selectively operated in both the multi-phase mode, and the reduced phase (single-phase) mode, while non-selected machine phases being enabled/disabled according to a mode signal.

Referring now to the drawings wherein like reference numerals are used to identify identical components in the various views, FIG. 1 shows the major mechanical components of a switched reluctance (SR) electric motor 10, which includes a stator assembly 12, and a rotor assembly 14.

Although the invention will be described and illustrated in the context of a switched reluctance electric motor 10, it will be appreciated that this invention may be used in conjunction with other well-known electric motor structures. Stator assembly 12, in a preferred embodiment, comprises a plurality of laminations 16. The laminations 16 are formed using a magnetically permeable material, such as iron.

Stator 12 is generally hollow and cylindrical in shape. A plurality of radially, inwardly extending poles 18 are formed on stator 12 (via laminations 16) and extend throughout the length thereof. Poles 18 are preferably provided in diametrically opposed pairs. In a constructed embodiment (not shown for clarity), each of the six poles 18 includes a respective pair of teeth for a total of 12 stator teeth. It should be appreciated, however, that a greater or lesser number of poles 18 may be provided in any particular configuration.

Each of the poles 18 may have a generally rectangular shape, when taken in cross-section. The radially innermost surfaces of the poles 18 are slightly curved so as to define an inner diameter representing bore 20. Bore 20 is adapted in size to receive rotor assembly 14.

Rotor assembly 14, when assembled into stator 12 (see FIG. 2) is coaxially supported within stator 12 for relative rotational movement by conventional means. For purposes of description only, rotor assembly 14 may be supported by conventional bearings (not illustrated) mounted in conventional housings (not shown) secured to the longitudinal ends of stator assembly 12. Rotor assembly 14 includes a generally cylindrical shaft 22, and rotor 24. Shaft 22 may be hollow. Rotor 24 is secured to shaft 22 for rotation therewith. For example, rotor 24 may be secured to shaft 22 by means of a spline (not shown), or other conventional means well-known in the art. Thus, it should be appreciated that shaft 22, and rotor 24 rotate together as a unit.

Rotor 24 includes the plurality of poles 26 formed on an outer surface thereof. Each pole 26 extends radially outwardly from the outer surface thereof and is formed having a generally rectangular shape, when taken in cross-section. Rotor poles 26 extend longitudinally throughout the entire length of the outer surface of rotor 24. The radially outermost surfaces of rotor poles 26 are curved so as to define an outer diameter, adapted in size to be received within the inner diameter defining bore 20. That is, the outer diameter formed by the poles 26 is slightly smaller than the inner diameter defined by the radially innermost curved surfaces of stator poles 18. Rotor poles 26 are also preferably provided in diametrically opposed pairs. Four (4) rotor poles 26 are provided on the illustrated rotor assembly 14. However, it should be appreciated that a greater or lesser number of rotor poles 26 may be provided. For example, in a constructed embodiment, fourteen (14) rotor poles are provided (not shown). For SR motors, in general, the number of rotor poles 26 differs from the number of stator poles 18, as is well-known. Rotor 24, including poles 26, may be formed from a magnetically permeable material, such as iron.

Referring now to FIG. 2, a diagrammatic view of a cross-section of an assembled motor 10 is illustrated. In particular, as referred to above, poles 18 occur in pairs: i.e., AA', BB', and CC'. The rotor poles 26 also appear in pairs. Stator windings 28 (shown only on stator pole pair AA' for clarity) of diametrically opposite poles (e.g., AA') associated with stator 12 are connected in series to form one machine phase. Thus, the windings 28 on poles AA' are referred to as "Machine Phase A" of SR motor 10. In the illustrated example, SR motor 10 also has a machine phase B, and a machine phase C. Each of these three machine phases may be energized individually, which, when done in a controlled manner, provides for rotation of rotor 24. Although a three-phase machine is described and illustrated, any machine having at least two phases (i.e., a selected machine phase to be switched between modes, and a nonselected machine phase to be operated only during a multi-phase mode) is contemplated as falling within the spirit and scope of the present invention. For example, four-phase motors are contemplated as within the spirit and scope of the invention.

Before preceding to a detailed description of the apparatus and technique for controlling a switched reluctance motor in accordance with the preferred embodiment of the present invention, a basic overview of the control established by the present invention will be set forth.

Referring now to FIG. 3, an underlying assumption for operation of an embodiment of the present invention is that when SR motor 10 is loaded, a relatively lower rotor speed will result, while, in contrast, when such load is lightened or removed from SR motor 10 (i.e., operation in the low load area), the rotor speed will rise relatively quickly. When SR motor 10 is loaded, and thus requires greater output power, the motor operates in a multi-phase mode wherein a first number of machine phases are energized to develop torque, and thus rotor rotation. When the load is lightened or removed from SR motor 10, however, the motor is controlled to operate in a reduced phase mode, wherein a second number less than the first number of the machine phases are energized to thereby operate the now-less-in-number machine phases at a higher current—i.e., at a more efficient level to reduce the amount of power that would otherwise be consumed. In the preferred embodiment, all three phases of three-phase SR motor 10 are energized in the multi-phase mode, while only a single phase (e.g., machine phase A) is energized in the reduced phase mode. It should be understood that illustration and description of this preferred embodiment does not diminish the generality of the principles of this invention, any reduced-in-number phase operation being with the spirit and scope of this invention. The remainder of this disclosure shall be made with reference to the preferred embodiment, without any loss in generality.

FIG. 3 shows a hysteresis operating band employed by the present invention to eliminate undesirable "hunting" or "oscillation" between the reduced phase mode and the multi-phase mode. In particular, two separate current control references are used for the energization of the stator windings associated with the selected machine phase; that is, a first reference is used for the single-phase (i.e., reduced phase) mode of operation, and a second reference for the multi-phase mode of operation. The desired current through the selected machine phase is a function of speed, which is, in turn, a function of the load on the motor.

To illustrate how this map is applied, first assume operation of motor 10 in a steady-state loaded area of a torque-versus-phase current graph. Further assume that, when loaded, SR motor is controlled in a multi-phase mode. In the multi-phase mode, in the preferred embodiment, each of the machine phases are energized to a desired multi-phase current reference 30, which varies inversely as a function of rotor speed. When the load is removed (i.e., low load condition), the rotor speed increases relatively rapidly until a first, high, predetermined speed level $S_H$, is reached. While in the multi-phase mode, each of the machine phases are energized sequentially to effect rotation of rotor 24.

When the rotor speed reaches $S_H$, the operating mode of the SR motor 10 changes from the multi-phase mode to the single-phase mode (i.e., reduced phase mode), wherein the current reference for the selected, single phase to be energized transitions along path 32 to a single-phase current reference level 34. Single-phase current reference level 34 also varies inversely with rotor speed, and is greater than the multi-phase current reference. The magnitude of the reference 34 is greater since only a single machine phase is being energized; however, the total power consumed is less than if all the phases were energized according to the lower, multi-phase reference. The relative magnitudes of reference 30, and reference 34 are selected to maximize operating efficiency (i.e., energize a machine phase in an efficient region of the torque-versus-phase current graph).

When the load is again applied to SR motor 10, the rotor speed drops quickly, along trace 34. Thus, the motor operates in the single-phase mode down to a second lower predetermined speed level, $S_L$. At this point, the motor 10 switches to multi-phase mode again for low-speed (i.e., loaded) operation. As the motor returns to high speed operation (via lightening or removal of the load), the switch from multi-phase mode to single-phase mode again occurs at speed $S_H$. A hysteresis band is therefore utilized to prevent oscillation between modes of operation when the load is changing at a very slow rate. Only one phase of the motor is controlled to have separate current control references that toggles between the single-phase and the multi-phase modes according to rotor speed (i.e., existence of a load) as described in FIG. 3. The remaining, non-selected machine phases require only a multi-phase current reference, since, in the single-phase mode, the non-selected machine phases are disabled (i.e., remain deenergized). It should be appreciated that this hysteresis loop technique can be applied to other situations, such as, for example, switches between energization of three (3) machine phases and two (2) machine phases, as well as between energization of two (2) machine phases and one (1) machine phase (for a three phase motor). Other "step" transitions are within the spirit and scope of this invention.

FIG. 4 shows an apparatus 40 for controlling SR motor 10 to change operating modes between the single-phase operating mode, and the multi-phase operating mode. Apparatus 40 includes a controller 42, and a plurality of drive circuits $44_1, 44_2, \ldots, 44_N$.

Controller 42 is responsive to a plurality of machine phase commutation signals $\Phi_n$ for generating a plurality of output current reference signals $I_{ref1}, I_{ref2}, \ldots, I_{refn}$, and a MODE signal.

The machine phase commutation signals $\Phi_n$ comprise a plurality of individual signals, one for each machine phase of SR motor 10, wherein each one of the plurality of signals is indicative of whether the respective machine phase is commanded to be energized. Collectively, the machine phase commutation signals may be processed to provide an indication of the magnitude of the speed of rotor 24.

Each one of the output current reference signals $I_{ref1}, I_{ref2}, \ldots, I_{refn}$, has associated therewith a magnitude corresponding to a desired current through the stator windings $28_i$ of the machine phase corresponding thereto. The MODE signal has a first state indicative of the multi-phase mode of operation, and a second state indicative of the single-phase (i.e., reduced phase) mode of operation.

Drive circuits $44_1, 44_2, \ldots, 44_N$, are respectively coupled to the current reference signals $I_{ref1}, I_{ref2}, \ldots, I_{refn}$, and are provided for energizing the corresponding machine phase to the desired energization current defined by the magnitude of the reference signals. The MODE signal is coupled to drive circuits $44_I$ corresponding to nonselected machine phases, and, operates to disable energization of the stator windings $28_i$ associated with the drive circuits when the MODE signal assumes the second state. Otherwise, when the MODE signal is in the first state, the nonselected machine phases are energized by way of the corresponding drive circuits $44_2, \ldots 44_N$.

Figure 5:
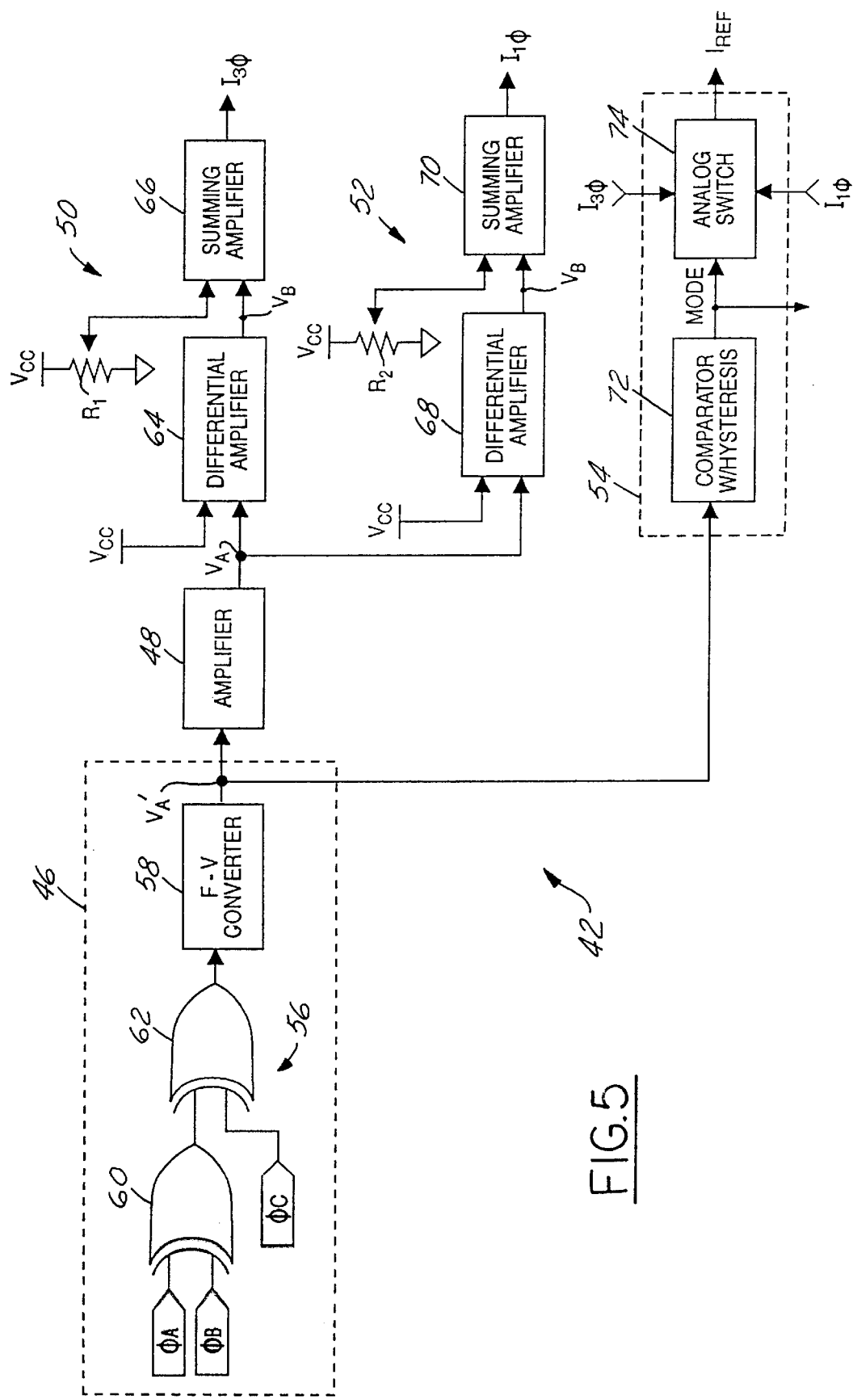
FIG. 5 is a simplified, partial schematic and block diagram view showing, in greater detail, the controller portion of the preferred embodiment illustrated in FIG. 4.

Referring now to FIG. 5, controller 42 is shown in greater detail, and includes means, such as speed sensing circuit 46, for sensing a speed of the rotor and generating a first speed signal $V'_A$ in response thereto, and an amplifier 48, means, such as multi-phase reference circuit 50, for generating a multi-phase current reference signal, means, such as single-phase reference circuit 52, for generating a single-phase current reference signal, and means, such as circuit 54, for changing the operating mode of the SR motor 10 from the multi-phase mode, when the rotor speed reaches a first predetermined level, and for changing the operating mode of motor 10 from the single-phase mode to the multi-phase mode when the rotor speed reaches a second predetermined level that is less than the first predetermined level to thereby define a hysteresis operating band.

Speed sensing circuit 46 is responsive to the above-mentioned machine phase commutation signals and is provided for generating the first speed signal. Circuit 46 includes logic means 56, responsive to the machine phase commutation signals, for generating an output signal having a frequency which is indicative of the rotor speed, and a frequency-to-voltage converter 58 responsive to the logic means output signal for generating the first speed signal, wherein the first speed signal has a voltage magnitude corresponding to the rotor speed.

Logic means 56 includes a first exclusive-OR (XOR) gate 60, and a second exclusive-OR gate 62 connected in series to generate an output pulse train whose frequency of transition corresponds to the rotor speed. It should be appreciated that other circuit arrangements performing the same logical functions as described above fall within the spirit and scope of the present invention.

Frequency-to-voltage converter 58 is conventional in the art and performs its well-known function.

Amplifier 48 provides a voltage level, and impedance interface function to translate signal $V'_A$ to a signal having a power level sufficient to drive subsequent stages; namely, second speed signal $V_A$.

Multi-phase reference circuit 50 is responsive to second speed signal $V_A$ for generating a multi-phase input current reference signal $I_{3\Phi}$. Circuit 50 includes a differential amplifier 64, which generates signal $V_B$, and a summing amplifier 66 responsive to signal $V_B$, for generating the multi-phase input current reference signal $I_{3\Phi}$.

Differential amplifier 64 is well-known and conventional in the art, and may comprise, for example, an operational amplifier appropriately configured. Likewise, summing amplifier 66 may include an operational amplifier, and functions to add the magnitude of each signal appearing on its two inputs; namely, signal $V_B$ and the voltage generated by the voltage divider established by adjustable resistor $R_1$. Summing amplifier 66 is well-known and conventional.

Figure 6A:
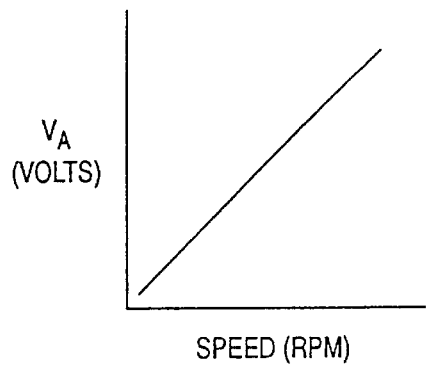
FIG. 6A is a simplified, speed-versus-voltage graph of the speed signal $V_A$ generated by the speed signal generating circuit shown in FIG. 5.
Figure 6B:
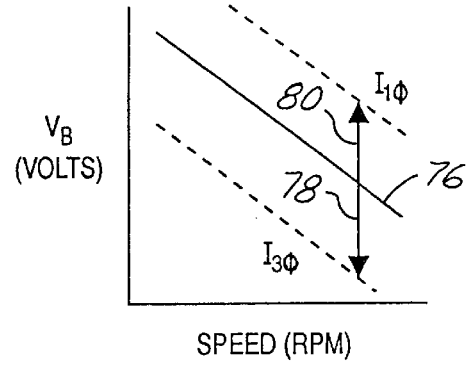
FIG. 6B is a simplified, speed-versus-voltage graph illustrating the reduced phase (single-phase) current reference signal, and the multi-phase current reference signal, both displaced relative to an inverted version of the graph of the speed signal shown in FIG. 6A.

FIGS. 6A and 6B illustrate the relationships of signals at various nodes of circuit, wherein FIG. 6A shows the second speed signal $V_A$ is plotted versus rotor speed. It should be appreciated that the magnitude of speed signal $V_A$ increases and is proportional to, the rotor speed.

Referring now to FIG. 6B, signal $V_B$, appearing at the output of differential amplifier 64, is illustrated as trace 76. It should be appreciated that the particular amplifier design for amplifier 64 may take one of a plurality of forms well-known in the art for which the trace of signal $V_A$ (FIG. 6A) is translated to trace 76 (FIG. 6B). Furthermore, it should also be appreciated that the particular design of summing amplifier 66 may take one of a plurality of forms well-known in the art in order to translate trace 76 by way of displacement 78 to the trace indicated at $I_{3\Phi}$ (FIG. 6B).

Referring to FIG. 5, single-phase (i.e., reduced phase) reference circuit 52 includes second differential amplifier 68, and second summing amplifier 70 and is provided for generating single-phase input current reference signal $I_{1\Phi}$. Differential amplifier 68 is responsive to the second speed signal $V_A$, and generates a signal that is similar to trace 76 is FIG. 6B. The particular design of differential amplifier 68 may take any one of a plurality of forms well-known and conventional in the art. Summing amplifier 70 is provided for summing the magnitudes of the output of differential amplifier 68 ($V_B$), and an offset voltage established by the voltage divider network comprising variable resistor $R_2$. This offset is indicated at 80 in FIG. 6B. The multi-phase input current reference signal $I_{3\Phi}$, and the single-phase input current reference signal $I_{1\Phi}$, have a voltage magnitude corresponding to a desired current through the stator windings when energized according to the multi-phase mode, and the single-phase mode, respectively.

Circuit 54 is provided for changing the operating mode of motor 10 from the multi-phase mode, to the single-phase mode when the rotor speed of rotor 24 reaches a first predetermined level (indicated at $S_H$ in FIG. 3), and for changing the operating mode of electric SR motor 10 from the single-phase mode to the multi-phase mode when the rotor speed of rotor 24 reaches a second predetermined level (indicated at $S_L$ in FIG. 3). $S_L$ is less than $S_H$ and $I_{1\Phi}$ is greater than $I_{3\Phi}$, wherein a hysteresis operating band is defined to prevent undesirable oscillation between the single-phase mode, and the multi-phase mode. Circuit 54 includes a comparator 72 having hysteresis, and an analog switch 74 connected thereto.

The comparator circuit 72 is operative to generate the MODE signal as a function of the first rotor speed signal $V'_A$, and internal reference signals corresponding to the first, high-speed rotor speed signal $S_H$, and, the second, low-speed rotor signal $S_L$ (both as shown in FIG. 3).

Analog switch 74 includes a pair of inputs coupled to receive the multi-phase input reference signal $I_{3\Phi}$, and the single-phase input current reference signal $I_{1\Phi}$, and an output for generating the output current reference signal $I_{REF1}$ corresponding to the desired current through the selected machine phase. In particular, switch 74 is operative to select as an output on the switch output terminal, one of $I_{3\Phi}$ and $I_{1\Phi}$ according to whether the mode signal is in a first state, or a second state, respectively. The output current reference signals for the non-selected machine phases of electric motor 10, namely, $I_{REF2}$, . . . , $I_{REFn}$, may be generated either directly from the $I_{3\Phi}$, tap of summing amplifier 66, or, alternatively, may be generated by circuitry similar to circuits 46, 48 and 50 shown in FIG. 5.

Figure 7:
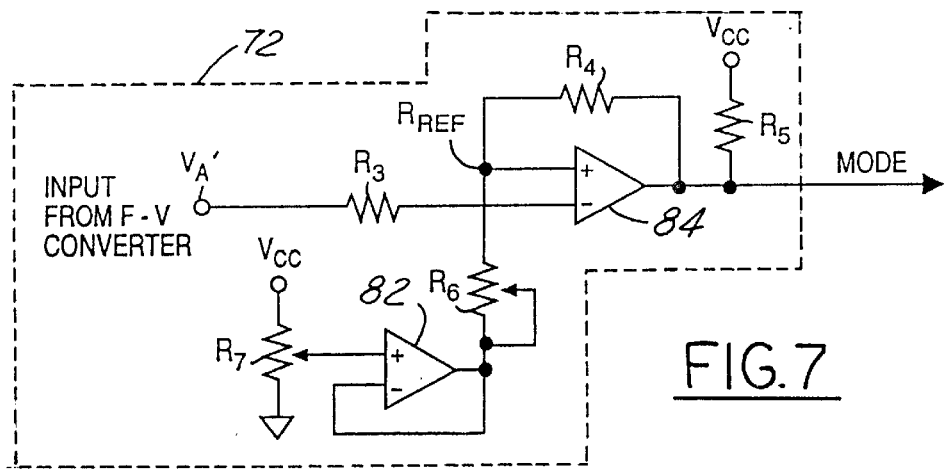
FIG. 7 is a simplified, schematic diagram view showing, in greater detail, the comparator with hysteresis illustrated in FIG. 5.

FIG. 7 shows the comparator 72 of FIG. 5 in greater detail. Comparator with hysteresis 72 includes a first operational amplifier 82, a comparator 84, and resistors $R_3$, $R_4$, $R_5$, $R_6$ (variable; potentiometer), and $R_7$ (variable; potentiometer). Operational amplifier 82, and voltage comparator 84 are conventional, and well-known components in the art and take the form of commercially available part numbers LM2904, and LM2901, respectively, from National Semiconductor. Resistors $R_3$–$R_7$ are also conventional, and whose values and tolerance ratings may be selected in accordance with desired operating characteristics, and is within the reach of one of ordinary in the art.

In the constructed embodiment, resistor $R_3$ assumes a value of 100k ohms, resistor $R_4$ 120k ohms, resistor $R_5$, 1k ohm, while resistors $R_6$ and $R_7$ have a variable resistance up to approximately 100K ohms, and 10K ohms, respectively.

Circuit 72 provides for a small amount of positive feedback and hysteresis relative to op amp 84. Op amp 82, resistor $R_6$ and $R_7$ are provided for generating a reference voltage $V_{REF}$ at the inverting input of op amp 84. The values of resistors $R_6$ and $R_7$ define the magnitude of the voltage reference $V_{REF}$ in accordance with well-known design principles.

To describe the operation of circuit 72, assume that the non-inverting input, which is coupled to the speed signal from frequency-to-voltage converter 58 by way of resistor $R_3$, goes above the reference input. This situation will drive the output, the MODE signal, towards ground, which in turn pulls the reference voltage $V_{REF}$ down through resistor $R_4$. The trip voltage (i.e., the reference $V_{REF}$) is now defined at a lower voltage level. When the speed signal decreases below this new, now-lower, trip signal, the output mode signal will again switch high, thus driving the voltage reference to a higher level (as pulled up through $R_4$), and thus providing the needed $\Delta V$ between the upper and lower trip points (i.e., corresponding to $S_H$ and $S_L$, respectively).

The control apparatus in accordance with the present invention accomplishes an improved control of the operation of a switched reluctance electric motor, by virtue of having the capability of controlling an electric motor in either a reduced phase operating mode, wherein less than all of the plurality of machine phases are energized, and a multi-phase operating mode wherein all of the machine phases are energized. The ability to operate a switched reluctance machine in a reduced phase mode, when a low load condition occurs, permits a substantially increased operating efficiency, since the aggregate power drawn from a power supply is less (i.e., although the phases that are energized are operated at a higher current level, there are less phases on, and, in addition, each phase is being operated in a more efficient region). The hysteresis loop control feature employed in the basic multi-to-reduced phase operating transition provides for smooth and reliable operation by substantially eliminating "hunting" or "oscillating" between modes of operation.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

We claim:

1. An apparatus for controlling a switched reluctance machine to change operating modes between a multi-phase operating mode and a reduced phase operating mode wherein the machine includes a rotatable rotor, a stator, and a plurality of stator windings defining a corresponding plurality of machine phases, said apparatus comprising:

means for sensing a speed of the rotor and generating a speed signal in response thereto;

means responsive to said speed signal for changing the operating mode of the machine from the multi-phase mode, wherein a first number of machine phases are energized, to the reduced phase mode, wherein a second number less than said first number of machine phases are energized, when said rotor speed reaches a first predetermined level, and for changing the operating mode of the machine from the reduced phase mode to the multi-phase mode when said rotor speed reaches a second predetermined level that is less than said first predetermined level to thereby define a hysteresis operating band to prevent undesirable oscillation between the reduced phase mode and the multi-phase mode.

2. The apparatus of claim 1 wherein said sensing means includes logic means responsive to machine phase commutation signals for generating an output signal having a frequency which is indicative of said rotor speed, said sensing means further including frequency-to-voltage converter means responsive to said logic means output signal for generating said speed signal wherein said speed signal has a voltage magnitude corresponding to said rotor speed.

3. The apparatus of claim 1 wherein said changing means includes means responsive to said speed signal for generating a mode signal having a first state indicative of the multi-phase mode of operation, and a second state indicative of the reduced phase mode of operation, said mode signal being operative, when in said second state, to disable energization of machine phases selected for nonoperation during the reduced phase mode.

4. The apparatus of claim 3 wherein said mode signal generating means includes a comparator having hysteresis.

5. An apparatus for controlling a switched reluctance machine to change operating modes between a multi-phase operating mode and a reduced phase operating mode wherein the machine includes a rotatable rotor, a stator, and a plurality of stator windings defining a corresponding plurality of machine phases, comprising:

a speed sensing circuit for sensing a speed of the rotor and generating a speed signal in response thereto;

a comparator circuit responsive to said speed signal for changing the operating mode of the machine from the multi-phase mode, wherein a first number of machine phases are energized according to a predetermined operating strategy, to the reduced phase operating mode, wherein a second number less than said first number of machine phases are energized according to said strategy, when said rotor speed reaches a first predetermined level, and for changing the operating mode of the machine from the reduced phase mode to the multi-phase mode when said rotor speed reaches a second predetermined level that is less than said first predetermined level to thereby define a hysteresis operating band to prevent undesirable oscillation between the reduced phase mode and the multi-phase mode.

6. The apparatus of claim 5 wherein said sensing circuit includes a logic circuit responsive to machine phase commutation signals for generating an output signal having a frequency which is indicative of said rotor speed, said sensing circuit further including a frequency-to-voltage converter circuit responsive to said logic circuit output signal for generating said speed signal wherein said speed signal has a voltage magnitude corresponding to said rotor speed.

7. The apparatus of claim 5 wherein said comparator circuit is operative to generate a mode signal having a first state indicative of the multi-phase mode of operation, and a second state indicative of the reduced phase operating mode of operation, said mode signal being operative, when in said second state, to disable energization of predetermined ones of said machine phases selected for non-operation during the reduced phase mode.

8. An apparatus for controlling a switched reluctance machine to change operating modes between a multi-phase operating mode and a reduced phase operating mode wherein the machine includes a rotatable rotor, a stator, and a plurality of stator windings defining a corresponding plurality of machine phases, comprising:

a speed sensing circuit for sensing a speed of the rotor and generating a speed signal in response thereto;

a comparator circuit responsive to said speed signal for changing the operating mode of the machine from the multi-phase mode, wherein a first number of machine phases are energized according to a predetermined operating strategy, to the reduced phase operating mode, wherein a second number less than said first number of machine phases are energized according to said strategy, when said rotor speed reaches a first predetermined level, and for changing the operating mode of the machine from the reduced phase mode to the multi-phase mode when said rotor speed reaches a second predetermined level that is less than said first predetermined level to thereby define a hysteresis operating band to prevent undesirable oscillation between the reduced phase mode and the multi-phase mode, said apparatus further comprising a multi-phase reference circuit responsive to said speed signal for generating a multi-phase current reference signal having a magnitude corresponding to a desired multi-phase current level through each one of the first number of machine phases, and a reduced phase reference circuit responsive to said speed signal for generating a reduced phase current reference signal having a magnitude corresponding to a desired reduced phase current level through each one of the second number of machine phases, said apparatus further comprising an analog switch having an output and a pair of inputs coupled to said multi-phase reference circuit and said reduced phase reference circuit, respectively, said analog switch being operative for selecting and outputting on said switch output one of said multi-phase and reduced phase current reference signals in accordance with said mode signal.

9. The apparatus of claim 8 further comprising a plurality of machine phase driver circuits coupled to a respective one of said plurality of machine phases for energization thereof wherein said analog switch output is connected to at least one machine phase driver circuit to thereby vary a current level of the machine phase associated therewith.

10. The apparatus of claim 9 wherein said mode signal is applied to said nonselected ones of said plurality of machines phases to thereby disable energization thereof.

11. An electric motor comprising:

a stator including a plurality of stator poles having stator windings provided thereon defining a plurality of motor phases;

a rotor supported for rotation relative to said stator, and including a plurality of rotor poles;

a speed sensing circuit for sensing a speed of said rotor and generating a speed signal in response thereto;

a multiple-phase reference circuit responsive to said speed signal for generating a multi-phase current reference signal;

a reduced phase reference circuit responsive to said speed signal for generating a reduced phase current reference signal;

a comparator circuit responsive to said speed signal for generating a mode signal having a first state indicative of the multi-phase mode of operation, wherein a first number of machine phases are energized, and a second state indicative of the reduced phase mode of operation, wherein a second number less than said first number of machine phases are energized, said mode signal transitioning from said first state to said second state when said rotor speed reaches a first predetermined level, said mode signal transitioning from said second state to said first state when said rotor speed reaches a second predetermined level that is less than said first predetermined level to thereby define a hysteresis operating band to prevent undesirable oscillation between the single-phase mode and the multi-phase mode;

an analog switch having an output for selecting and outputting on said switch output one of said multi-phase current reference signal and said reduced phase current reference signal in accordance with the state of said mode signal;

a plurality of phase drive circuits for energizing said plurality of machine phases, said analog switch output being connected to at least one of said phase drive circuits for varying a current level through the machine phase connected thereto according to one of said multi-phase current reference and said reduced phase current reference signals.

* * * * *